May 19, 1936.  C. B. ADAMS  2,041,387
FUEL TANK CAP LOCK
Filed June 22, 1935
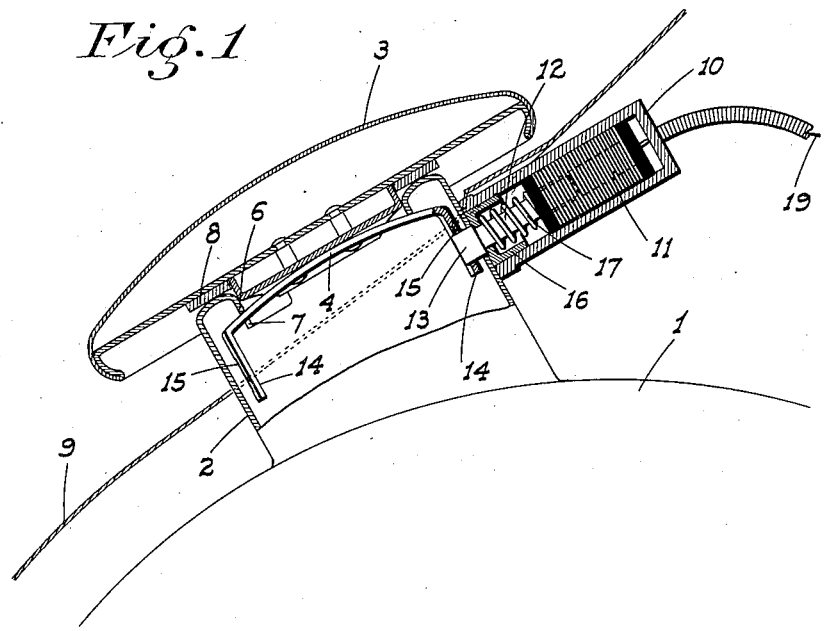
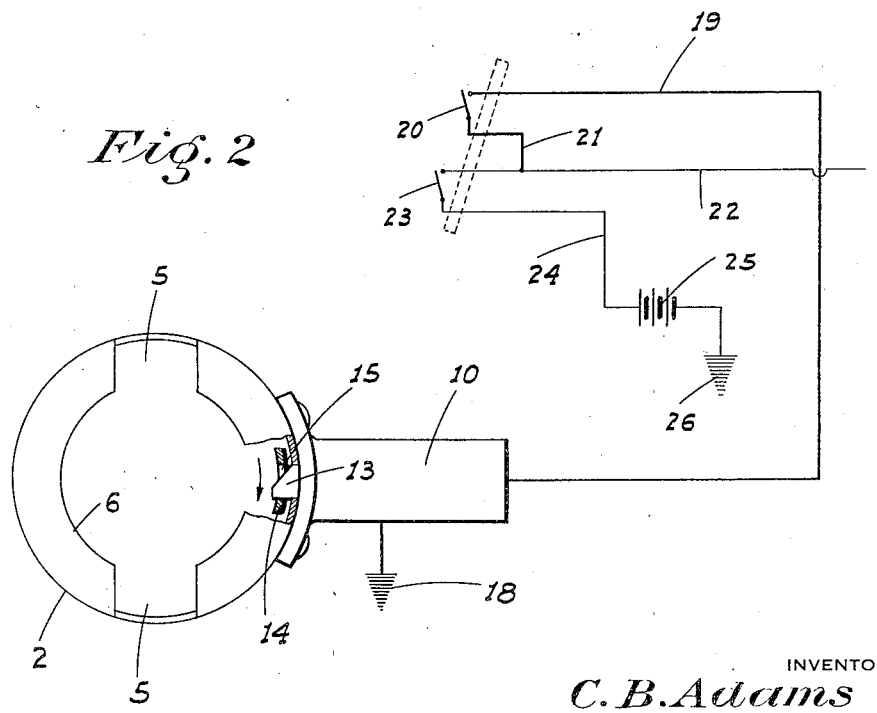
INVENTOR
C. B. Adams
BY
ATTORNEY Patented May 19, 1936

2,041,387

UNITED STATES PATENT OFFICE 2,041,387

FUEL TANK CAP LOCK

Carl B. Adams, Oak, Calif.

Application June 22, 1935, Serial No. 27,964

2 Claims. (Cl. 70—50)

This invention relates to a cap locking device for the fuel tank of motor vehicles and the invention is directed specifically and particularly to an electrically actuated lock for such fuel tank caps.

The purpose of my invention is to prevent unauthorized withdrawal of the fuel from the tank, and the principal object of my invention is to provide a locking device which will automatically lock the cap in place when the same is turned into place on the outer end of the filler tube of the tank and which will prevent removal of the cap except when the latch is retracted by an electrically actuated mechanism operable only from within the motor vehicle.

An additional object of my invention is to provide an electrically actuated mechanism for the purpose described which can only function when the usual key-controlled ignition switch of the motor vehicle is turned to an "on" position.

A further object of my invention is to provide a lock which is particularly adapted for use in connection with modern fuel tank cap and filler tube units.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a sectional elevation of my improved gas tank cap lock.

Figure 2 is a diagrammatic plan view of the filler tube and latch, illustrating the circuit I employ to accomplish my invention.

Referring now more particularly to the characters of reference on the drawing, the numeral 1 denotes a fuel tank having a usual filler tube 2 and removable cap 3. Mounted on the lower side of the cap is a cross arm 4 of spring metal adapted to pass through slots 5 formed at the upper end of the filler tube between the ends of the inturned flanges 6 of the tube when the cap is placed on the tube. The ends of the arm 4 after passing through the slots 5 frictionally engage the lower edges of the flanges 6 and come to rest against abutments 7 as the cap is turned. The usual gasket 8 prevents fuel leakage from the tube. The numeral 9 represents the metal sheath which extends as part of the body over the fuel tank.

Mounted at right angles to and on the filler tube 2 beneath the sheath 9 is a cylindrical metal casing 10 which is open at its inner end. Secured within this casing is a solenoid 11 having a slidable core and latch pin 12. This pin extends through an opening in the filler tube 2 and terminates in an enlarged bevel faced latch 13. The arm 4 is provided at its ends with downwardly projecting fingers 14 parallel to the inner sides of the filler tube. These fingers 14 are each formed with an opening 15 into either one of which the latch 13 is adapted to engage.

A cylindrical cup 16, slidable within the casing 10, is mounted on the pin 12 and abuts against the adjacent end of the latch 13. A compression spring 17 is positioned about the pin between the bottom of the cup 16 and the inner end of the solenoid.

The circuit which I employ comprises a ground 18 from one terminal of the solenoid while a wire 19 leads from the other solenoid terminal to one terminal of a suitable switch 20 mounted on the instrument panel of the vehicle. The other side of the switch 20 is connected by wire 21 to the ignition supply wire 22 which is only charged when the ignition switch 23 closes the ignition circuit through wire 24 and the battery 25 grounded as at 26.

Operation

In operation, my improved fuel tank cap lock functions as follows:

With the cap removed from the filler tube and when it is desired to place the cap on the tube and lock it in place, it is only necessary to insert the arm 4 through slots 5 and turn the cap in the direction indicated by the arrow in Figure 2. As the ends of the arm 4 reach the abutments 7 the latch 13, which has been retracted by the adjacent finger 14 engaging the beveled face of the latch as the cap turned, will snap into the opening 15 in said finger. This positively locks the cap against unauthorized retraction and removal.

To release the latch from the adjacent finger 14 the switch 20 as well as ignition switch 23 are closed causing current to flow through the solenoid 11 which causes the pin 12 to be drawn into the solenoid coil and withdrawing latch 13 from engagement with the finger 14. The cap 3 may then be removed by retractive rotation as usual. After the cap is removed, the switch 20 is opened and the pin and latch move into locking position again due to the force exerted by the spring 17 on cup 16 which engages against the back of the latch 13.

This cup 16 being slidable in casing 10 prevents the pin and latch assembly from getting out of proper alinement, and also positively limits the retractive movement of the latch relative to the filler tube.

By wiring the solenoid actuating switch 20 in series with the ignition switch, it is impossible for a person to unlock the tank cap when the ignition is locked and the vehicle is parked and not in use.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with the filler tube of a motor vehicle fuel tank, said tube having a flange adjacent its outer end, a separate closure cap for the tube, a flange engaging cross arm on the inner face of the cap, a finger on one end of the arm depending into the tube, latch means mounted in connection with the filler tube engaging with the finger when the cap is rotated to a predetermined position on the tube, and means operable from within the vehicle to retract the latch means at will.

2. In combination with the filler tube of a motor vehicle fuel tank, said tube having a flange adjacent its outer end, a separate closure cap for the tube, a flange engaging cross arm on the inner face of the cap, a finger on the cap depending into the tube, a casing mounted on the outside of the tube, a solenoid secured in the casing with its axis radially of the tube casing, a pin forming the core of the solenoid provided at its outer end with an enlarged latch slidably projecting through the adjacent wall of the tube to engage the finger, a cup on the pin adjacent the latch slidable in the casing, and a compression spring about the pin between the cup and adjacent end of the solenoid, said spring normally urging the latch into engagement with the finger, and means operable from within the vehicle to cause an electric current to pass through the solenoid.

CARL B. ADAMS.